UNITED STATES PATENT OFFICE.

GEORGES STRAUSS, OF PARIS, FRANCE, ASSIGNOR TO SOCIÉTÉ ANONYME LA COMPAGNIE GENERALE D'ELECTRO-CHIMIE DE BOZEL, OF PARIS, FRANCE, A CORPORATION OF FRANCE.

MANUFACTURE OF METALLIC SILICIDS.

948,190.  Specification of Letters Patent.  Patented Feb. 1, 1910.

No Drawing.  Application filed April 16, 1908. Serial No. 427,433.

*To all whom it may concern:*

Be it known that I, GEORGES STRAUSS, a citizen of the Republic of France, residing at Paris, France, have invented Improvements in the Manufacture of Metallic Silicids, of which the following is a specification.

This invention has for objects an improved process of producing and industrially applying metallic silicids, particularly alkali earthy silicids.

The known processes of producing metallic silicids are subject to serious inconveniences which are avoided according to this invention. By way of example take the production of calcium silicid. It is well known that by heating a mixture, in definite proportions, of lime, silica and carbon, in an electric furnace there is obtained calcium silicid ($CaSi_2$) according to the following equation:—

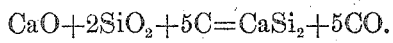

This method of production however is subject to a serious inconvenience in that the silica and the lime have a tendency to unite directly and to form silicates of lime which are difficult to reduce; moreover the yield of calcium silicid is thereby considerably diminished. Such process is not therefore practically successful.

Now in the production of calcium silicid according to this invention the calcium or the silicon is employed in such a form that it cannot give rise to the production, in the presence of the silica or the lime respectively, of a silicate or some other combination which is difficult to reduce.

In a suitable way of carrying out this invention the calcium is preferably employed in the form of calcium carbid in place of lime and the silicon in the form of metallic silicon in place of silica. The reaction takes place according to the following equations:—

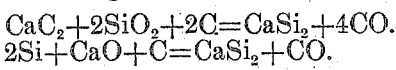

The improved process which prevents the formation of silicates which are difficult to reduce, is moreover easy to carry out. Practically it suffices to employ for this purpose the calcium carbid of commerce, which only contains, as is well known, about 85 (eighty five) per cent. of calcium carbid and 15 (fifteen) per cent. of free lime, and in the second case the silicon prepared in an electric furnace.

Although it is true that with the carbid of calcium of commerce the formation of silicates of lime is not absolutely avoided nevertheless, since the necessary calcium introduced in the form of lime is only in a very small proportion in comparison with that introduced in the form of calcium carbid ($CaC_2$) it results that the production of silicates of lime is negligible.

Experiments made with calcium silicid have shown that this metallic silicid is capable of replacing with advantage the aluminium usually employed in steel works for the purpose of preventing the formation of blow holes in steel ingots. The advantages ensuing from such application are, in addition to the economy secured by the very low price of calcium silicid, very great rapidity of reaction and the suppression of the undesirable "shortness" which aluminium communicates to ingots of steel.

What I claim is:—

1. The process of producing a metallic silicid which consists in causing carbon to re-act upon a mixture of silicon and an alkaline earth metal, the ingredients of said mixture being in such chemical form and proportions as to substantially prevent the formation of a difficultly reducible silicate, substantially as described.

2. The process of producing calcium silicid, which consists in causing carbon to react upon a mixture of silicon and calcium, the ingredients of said mixture being in such chemical form and proportions as to substantially prevent the formation of a difficultly reducible silicate, substantially as described.

3. The process of producing calcium silicids, which consists in heating an intimate mixing containing carbon, silicon and a calcium derivative adapted to substantially prevent the formation of a difficultly reducible compound, substantially as described.

4. The process of producing calcium silicids, which consists in heating an intimate mixture containing carbon, metallic silicon prepared in an electric furnace, and a calcium derivative, whereby the formation of a difficultly reducible compound is prevented, substantially as described.

5. The process of producing a pure metallic silicid, which consists in heating an intimate mixture containing carbon, silicon and an alkaline earth metal oxid adapted to substantially prevent the formation of a difficultly reducible silicate, substantially as described.

6. The process of producing a metallic silicid, which consists in heating an intimate mixture containing carbon, metallic silicon and an alkaline earth metal oxid adapted to substantially prevent the formation of a difficultly reducible silicate, substantially as described.

In testimony whereof I have signed my name to this specification, in the presence of two subscribing witnesses, at Paris this sixth day of April 1908.

GEORGES STRAUSS.

Witnesses:
 BENJAMIN BLOCH,
 DEAN B. MASON.